United States Patent
Isban et al.

(10) Patent No.: US 9,790,734 B1
(45) Date of Patent: Oct. 17, 2017

(54) INTERIOR REINFORCING STRUCTURE FOR A DOOR AND METHOD OF INSTALLING AN INTERIOR REINFORCING STRUCTURE IN A DOOR

(71) Applicant: American Containers, Inc., Plymouth, IN (US)

(72) Inventors: Leonard D. Isban, Plymouth, IN (US); Philip E. Brumbaugh, Plymouth, IN (US)

(73) Assignee: American Containers, Inc., Plymouth, IN (US)

( * ) Notice: Subject to any disclaimer, the term of this patent is extended or adjusted under 35 U.S.C. 154(b) by 116 days.

(21) Appl. No.: 14/450,579

(22) Filed: Aug. 4, 2014

Related U.S. Application Data (63) Continuation of application No. 61/861,660, filed on Aug. 2, 2013.

(51) Int. Cl.
| E06B 3/70 | (2006.01) |
| B32B 37/00 | (2006.01) |
| B32B 37/12 | (2006.01) |

(52) U.S. Cl.
CPC ........ *E06B 3/7015* (2013.01); *B32B 37/0076* (2013.01); *B32B 37/12* (2013.01); *B32B 2419/00* (2013.01); *E06B 2003/7019* (2013.01)

(58) Field of Classification Search
CPC .......... E06B 3/7015; E06B 3/7017; E06B 2003/7019; E06B 2003/7053; B32B 3/12; B32B 3/28; B32B 2419/00; B32B 37/0076; Y10T 428/24711; Y10T 428/24727; Y10T 428/24661; Y10T 428/24694; Y10T 428/24149; E04C 2/36
See application file for complete search history.

(56) References Cited

U.S. PATENT DOCUMENTS

| | | | |
|---|---|---|---|
| 1,183,842 A | 5/1916 | Alling | |
| 2,765,056 A | 10/1956 | Tyree | |
| 3,385,002 A | 5/1968 | Quinif | |
| 3,405,659 A * | 10/1968 | Hees | B60P 7/135 |
| | | | 160/370.1 |
| 3,934,805 A * | 1/1976 | Elaschuk | B65D 5/441 |
| | | | 108/51.3 |
| 4,007,309 A * | 2/1977 | Sewell | B32B 3/12 |
| | | | 156/197 |
| 4,130,682 A | 12/1978 | Lauko | |
| 4,236,365 A | 12/1980 | Wheeler | |
| 4,583,338 A | 4/1986 | Sewell et al. | |
| 4,811,538 A | 3/1989 | Lehnert et al. | |
| 5,155,959 A | 10/1992 | Richards et al. | |
| 5,167,105 A | 12/1992 | Isban et al. | |
| 5,466,211 A | 11/1995 | Komarek et al. | |
| 5,560,168 A | 10/1996 | Gagne et al. | |

(Continued)

*Primary Examiner* — Catherine A Simone
(74) *Attorney, Agent, or Firm* — Barnes & Thornburg LLP (57) ABSTRACT

A reinforcing structure for a door includes a first region constructed from a first grade of corrugated paperboard and second and third regions constructed from a second grade of corrugated paperboard. The first region may be expandable and the second and third regions may be non-expandable. A method for installing the reinforcing structure in a door having a frame and two opposed skins with recessed areas includes installing the reinforcing structure on the surfaces of the recessed areas between the skins.

9 Claims, 6 Drawing Sheets

(56) References Cited

U.S. PATENT DOCUMENTS

| | | |
|---|---|---|
| 5,582,571 A | 12/1996 | Simpson et al. |
| 5,681,641 A | 10/1997 | Grigsby et al. |
| 5,690,601 A | 11/1997 | Cummings et al. |
| 5,875,608 A | 3/1999 | Quinif |
| 6,170,224 B1 | 1/2001 | Boyse et al. |

* cited by examiner

ING STRUCTURE IN A DOOR

The present invention relates to doors and, in particular, to doors with interior reinforcing structures, such as hollow doors with corrugated paperboard reinforcing structures.

BACKGROUND AND SUMMARY OF THE INVENTION

One known type of door includes a substantially rectangular frame with opposing faces or skins attached to each side thereof. The resulting structure has a hollow interior space located between the two skins and bordered by the frame. Because the skins are often constructed from a relatively lightweight material, various fillers or support structures are often provided between the skins in the hollow interior space to provide increased structural integrity and to resist flexing of the skins if one were to push on them to open or close the door.

The door skins are sometimes flat sheets of material with a substantially planar outer surface. In other instances, the skins may be provided with decorative features, such as, for example, indentations that produce areas on the surface of the door that are raised or lowered with respect to adjacent areas on the door. In certain doors, for example, the skins will have one or more areas that are recessed inwardly toward the hollow space between the skins. It is often the case that both skins have the same recessed pattern. In such instances, the distance between the interior faces of the skins in the hollow space varies across the surface of the skins. For example, the distance between the skins in the recessed areas will be less than the distance between the skins in the non-recessed areas.

One embodiment of the present invention includes a method of installing a reinforcing structure in a door. The door has first and second stiles, first and second rails and first and second skins. The first skin has a first surface, a second surface and a recessed area defined by a perimeter. The recessed area of the first skin has a first surface that is recessed with respect to the first surface of the first skin and a second surface that extends beyond the second surface of the first skin. The second skin has a first surface, a second surface and a recessed area defined by a perimeter. The recessed area of the second skin has a first surface that is recessed with respect to the first surface of the second skin and a second surface that extends beyond the second surface of the second skin. The method includes the steps of securing the second surface of the first skin to the first and second stiles and the first and second rails, providing a reinforcing structure having a first region, a second region and a third region, securing the reinforcing structure to the second surface of the recessed area of the first skin and securing the second surface of the second skin to the first and second stiles and the first and second rails.

In one embodiment of the invention, the reinforcing structure is secured entirely within the perimeter of the recessed area of the first skin.

In another embodiment, at least one region of the reinforcing structure is an expandable corrugated paperboard structure. In another embodiment, the first and third regions of the reinforcing structure are non-expandable corrugated paperboard structures. The second region may be located between the first and third regions of the reinforcing structure.

In certain embodiments of the invention, the reinforcing structure is constructed from a single grade of corrugated paperboard. In other embodiments, the reinforcing structure is constructed from multiple grades of corrugated paperboard. In one embodiment, the first region of the reinforcing structure is constructed from a first grade of corrugated paperboard and the second and third regions of the reinforcing structure are constructed from a second grade of corrugated paperboard.

In other embodiments of the present invention, at least one region of the reinforcing structure is an expandable corrugated paperboard structure and the method further includes the step of expanding the expandable corrugated paperboard structure in the direction of the stiles prior to securing the reinforcing structure to the second surface of the recessed area of the first skin.

In another embodiment of the present invention, the method includes the step of providing a second reinforcing structure and securing it to the second surface of the first skin and the second surface of the second skin.

In one embodiment of the present invention, a reinforcing structure for a door includes a first region constructed from a first grade of corrugated paperboard and second and third regions constructed from a second grade of corrugated paperboard. The first region may be expandable and the second and third regions may be non-expandable.

DETAILED DESCRIPTION OF THE EMBODIMENTS OF THE INVENTION

Figure 1:
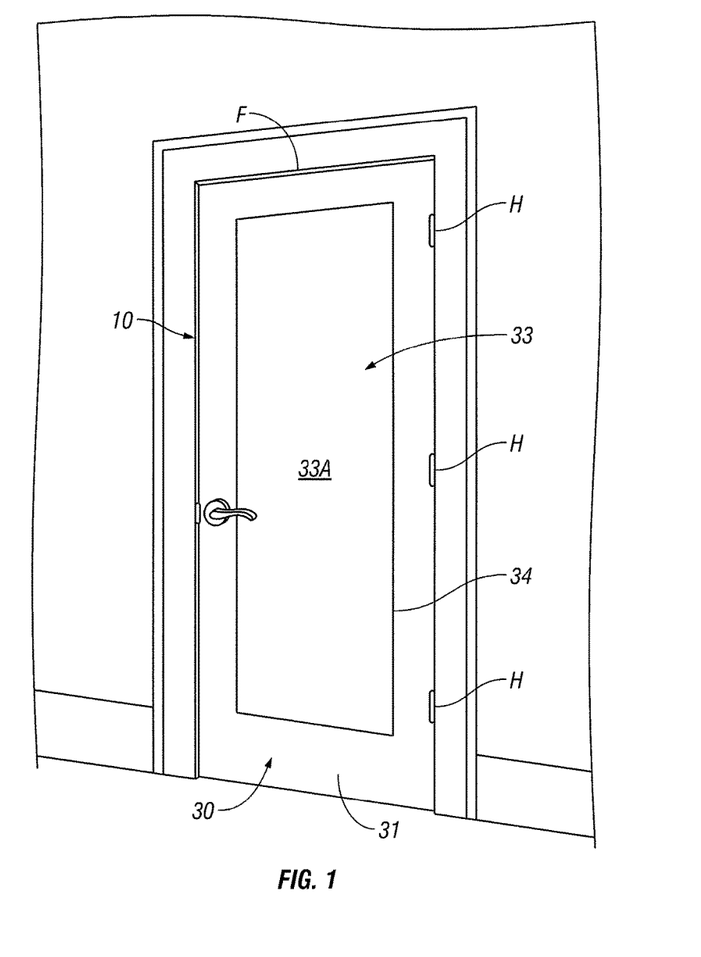
FIG. 1 is a perspective view of a door according to one embodiment of the present invention installed in a residence.

FIG. 1 is a perspective of a door 10 according to one embodiment of the present invention. Door 10 is hung in a door frame F by hinges H in a conventional manner. Referring to FIGS. 1-4, door 10 generally includes a frame 20 and a pair of opposing skins 30.

Figure 3:
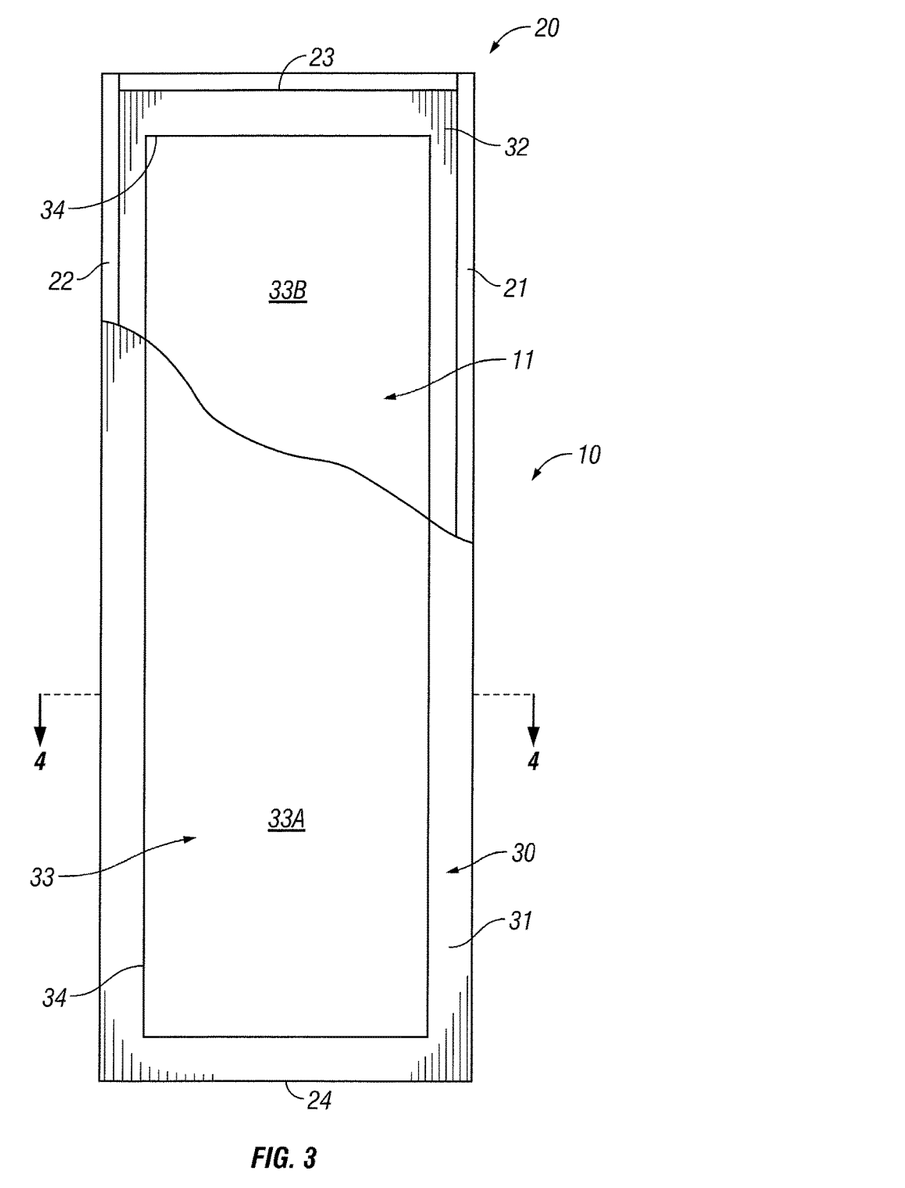
FIG. 3 is a plan view of the door shown in FIG. 1 with a portion of one skin and the reinforcing structure removed.

Frame 20 includes a first vertical member or stile 21, a second vertical member or stile 22, a first horizontal member or rail 23 and a second horizontal member or rail 24. Stiles 21 and 22 and rails 23 and 24 are joined to form a substantially rectangular structure.

Figure 2:
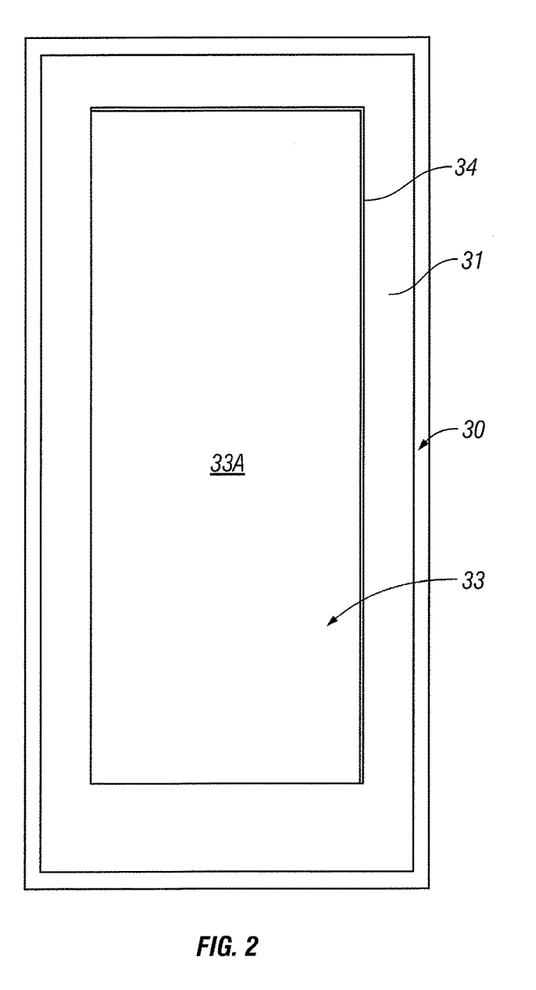
FIG. 2 is a plan view of a skin that is a component of the door shown in FIG. 1.

Each skin 30 includes a first or outwardly facing surface 31 and a second or inwardly facing surface 32. Skins 30 further include a recessed area 33 defined by a perimeter 34 and a first or outwardly facing surface 33A which is recessed with respect to surface 31 and a second or inwardly facing surface 33B that extends beyond surface 32.

Figure 4:
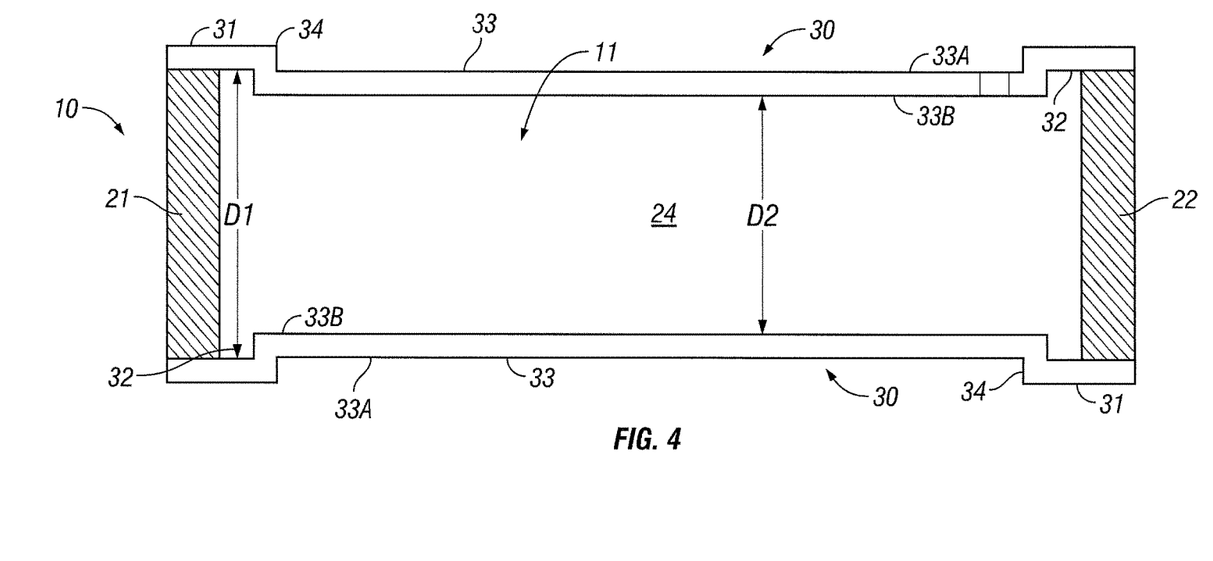
FIG. 4 is a cross-sectional view taken along line 4-4 in FIG. 3.

Skins 30 may be attached to frame 20 by a number of means including, for example, by adhesives. As shown in FIGS. 3 and 4, attaching skins 30 to frame 20 creates a door with a hollow interior space 11 defined by frame 20 and surfaces 32 of opposing skins 30. Surfaces 33B of skins 30 extend into space 11 as shown in FIG. 4. A first distance D1 separates opposing surfaces 32 of skins 30 and a second distance D2 separates opposing surfaces 33B of skins 30. Distance D1 is greater than distance D2.

Figure 5:
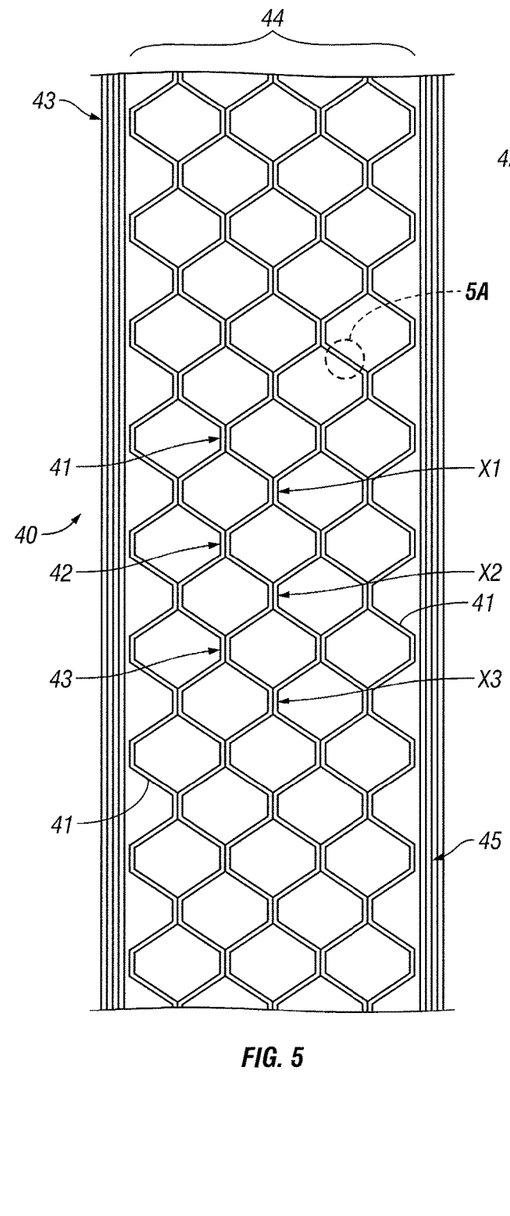
FIG. 5 is a plan view of a reinforcing structure according to one embodiment of the present invention which may be used, for example, with the door shown in FIG. 1.
Figure 5A:
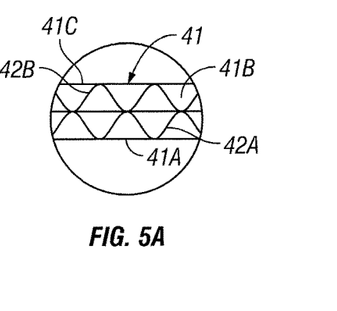
FIG. 5A shows detail of the area indicated in FIG. 5.

FIG. 5 is a plan view of reinforcing structure according to one embodiment of the present invention. Structure 40 in the embodiment shown is produced from a plurality of corrugated paperboard members 41 (FIG. 5A). Each paperboard member 41 includes a first liner sheet 41A, a second liner sheet 41B and a third liner sheet 41C. A first sinuous filler sheet 42A is located between liner sheets 41A and 41B. A second sinuous filler sheet 42B is located between liner sheets 41B and 41C. Although paperboard members 41 may take a variety of forms, in the embodiment shown the configuration is what is known as "A/C" corrugated paperboard.

Structure 40 is formed by securing multiple members 41 together to form an expandable stack of members 41. Members 41 may be joined together by a number of means, such as by adhesive. In the embodiment shown, members 41 are joined together so as to produce three distinct regions. Specifically, in the embodiment shown, structure 40 includes a first region 43, a second region 44 and a third region 45. First region 43 and third region 45 include a plurality of members 41 joined together so as to form a substantially rectangular, non-expandable stack of members 41. Second region 44 includes an expandable honeycomb structure formed by adhering a member 41 to two adjacent members 41 at alternating, spaced-apart locations. For example, referring to FIG. 5, a first member 41 is joined to a first adjacent member 41 at a plurality of locations X1, X2, X3, etc. The first member 41 is joined to a second adjacent member 41 at a plurality of locations Y1, Y2, Y3, etc. In the embodiment shown, locations X1, X2, X3, etc. are offset from locations Y1, Y2, Y3, etc. such that the X locations are approximately centered between the Y locations to create an expandable honeycomb structure including a plurality of cells. Note that structure 40 can be formed by constructing a first section including region 43 and part of region 44 and a second section including region 45 and part of region 44. The two parts of region 44 can then be joined to form structure 40.

Figure 6:
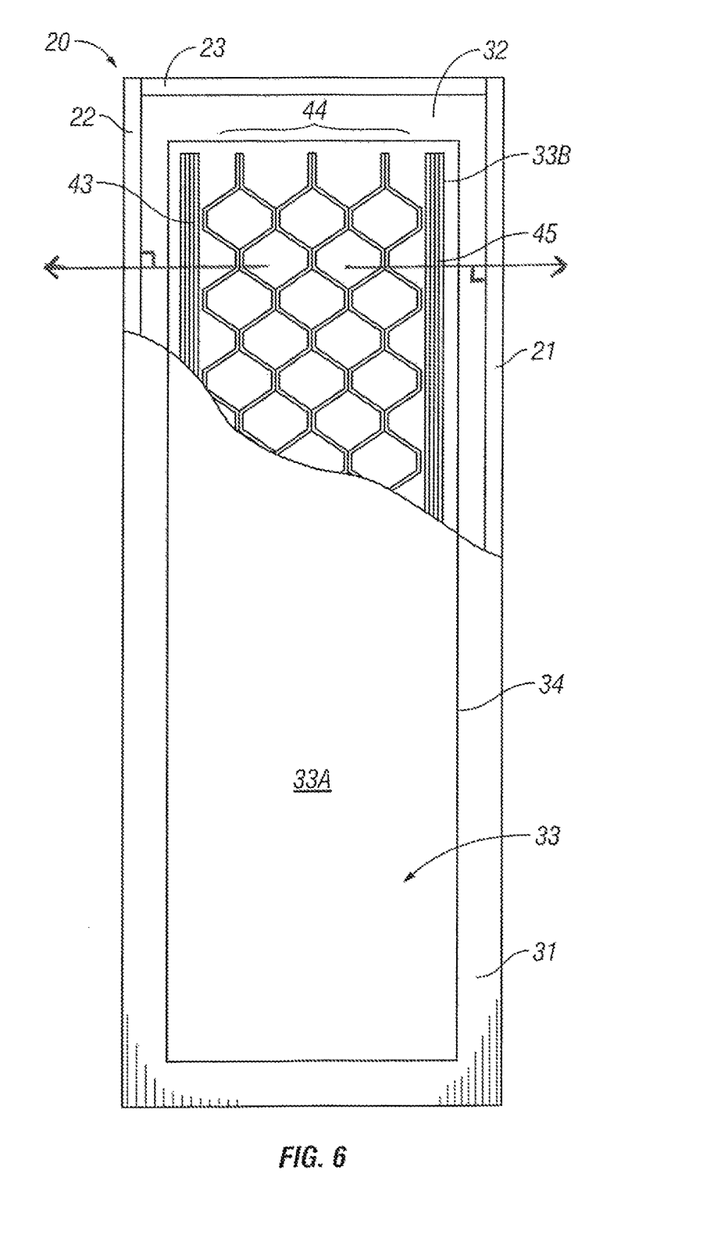
FIG. 6 is a plan view of the door shown in FIG. 1 with a portion of the skin removed to illustrate the reinforcing structure shown in FIG. 5 installed in the interior of the door.

Structure 40 may be incorporated into door 10 or other doors to provide support between the door skins. To do so, one skin 30 is secured to frame 20. Adhesive is applied to structure 40 by, for example, feeding structure 40 through a glue spreader, and two installers, one positioned adjacent first stile 21 of frame 20 and the other positioned adjacent second stile 22 of frame 20, grasp regions 43 and 45, extend them outwardly and press structure 40 against inwardly facing surface 33B of skin 30. Structure 40 is positioned such that it is located either entirely within perimeter 34 of recessed area 33 on surface 33B or, alternatively, slightly overlapping perimeter 34. However, no portion of structure 40 should contact inwardly facing surface 32. Various other reinforcing structures, such as those commonly referred to in the industry as "sticks," may be positioned against or adhered to inwardly facing surface 32 to provide additional support. Note that because the distance D1 is greater than the distance D2, these additional reinforcing structures will be thicker than structure 40 so that they contact inwardly facing surfaces 32 on each skin 30. A second skin 30 is then adhered to structure 40 and frame 20.

Although the present invention has been shown and described in detail the same is to be taken by way of example only and not by way of limitation. Numerous changes can be made to the embodiments described without departing from the scope of the invention. For example, members 41 can be constructed from corrugated paperboard grades other than A/C, such as "C/C" or other corrugated paperboard configurations. Multiple corrugated paperboard grades can be used within a single structure 40. For example, regions 43 and 45 could be produced from one grade of corrugated paperboard and region 44 could be produced from a different grade of corrugated paperboard. Structure 40 can be installed in other door configurations, such as 3, 4 or 5 panel doors. Note also that structure 40 can be installed in hollow doors of various thicknesses, such as 1 and ⅛ inches, 1 and ⅜ inches, 1 and ¾ inches, etc.

What is claimed is:

1. A reinforcing structure for a door, the reinforcing structure including:
   a first, expandable region constructed from a plurality of corrugated paperboard sheets of a first grade of corrugated paperboard;
   a second, nonexpandable region constructed from a plurality of corrugated paperboard sheets of a second grade of corrugated paperboard, each of said plurality of corrugated paperboard sheets having a first surface, a second opposing surface extending in a plane parallel to the first surface, the first surface of at least one of said plurality of corrugated paperboard sheets being secured to the first surface of an adjacent one of said plurality of corrugated paperboard sheets;
   a third, nonexpandable region constructed from a plurality of corrugated paperboard sheets of the second grade of corrugated paperboard, each of said plurality of corrugated paperboard sheets having a first surface, a second opposing surface extending in a plane parallel to the first surface, the first surface of at least one of said plurality of corrugated paperboard sheets being secured to the first surface of an adjacent one of said plurality of corrugated paperboard sheets; and
   wherein the first region is located between the second and third regions and is connected to the second and third regions.

2. A door and reinforcing structure:
   the door including:
   a frame having a first stile, a second stile, a first rail, a second rail;
   a first skin having a first surface, a second surface and a recessed area defined by a perimeter and having a first surface that is recessed with respect to the first surface of the first skin and a second surface that extends beyond the second surface of the first skin;
   a second skin having a first surface, a second surface and a recessed area defined by a perimeter and having a first surface that is recessed with respect to the first surface of the second skin and a second surface that extends beyond the second surface of the second skin;
   the reinforcing structure including:
   a first, expandable region constructed from corrugated paperboard;
   a second, nonexpandable region constructed from a plurality of adjacent corrugated paperboard sheets having opposed surfaces, at least one surface of one of the paperboard sheets positioned so as to be in contact with the surface of an adjacent paperboard sheet; and
   a third, nonexpandable region constructed from a plurality of adjacent corrugated paperboard sheets having opposed surfaces, at least one surface of one of the paperboard sheets positioned so as to be in contact with the surface of an adjacent paperboard sheet; and wherein the reinforcing structure is located between the first and second skins and is secured entirely within the perimeter of the recessed areas of the first skin and second skins.

3. The door and reinforcing structure of claim 2, wherein the expandable region is located between the second and third nonexpandable regions and is secured to the second and third nonexpandable regions.

4. The door and reinforcing structure of claim 2, wherein the reinforcing structure is constructed from a single grade of corrugated paperboard.

5. The door and reinforcing structure of claim 2, wherein the reinforcing structure is constructed from multiple grades of corrugated paperboard.

6. The door and reinforcing structure of claim 5, wherein the expandable region of the reinforcing structure is constructed from a first grade of corrugated paperboard and the nonexpandable regions are constructed from a second grade of corrugated paperboard.

7. The door and reinforcing structure of claim 2, wherein the nonexpandable regions extend parallel to the door stiles.

8. The door and reinforcing structure of claim 2, wherein the expandable region expands in the direction of the door stiles.

9. The door and reinforcing structure of claim 2, wherein each of the skins includes a single recessed area.

\* \* \* \* \*